(12) United States Patent
Nugent (10) Patent No.: US 11,877,557 B2
(45) Date of Patent: Jan. 23, 2024

(54) LIVING-GRASS PET WASTE STATION SYSTEM

(71) Applicant: Bethel Farms, LLLP, Arcadia, FL (US)

(72) Inventor: William Nugent, Arcadia, FL (US)

(73) Assignee: Bethel Farms, Inc., Arcadia, FL (US)

( * ) Notice: Subject to any disclaimer, the term of this patent is extended or adjusted under 35 U.S.C. 154(b) by 0 days.

(21) Appl. No.: 17/106,841

(22) Filed: Nov. 30, 2020

(65) Prior Publication Data

US 2022/0167583 A1    Jun. 2, 2022

(51) Int. Cl.
*A01K 1/01* (2006.01)

(52) U.S. Cl.
CPC .................. *A01K 1/0107* (2013.01)

(58) Field of Classification Search
CPC .................................................. A01K 1/0107
See application file for complete search history.

(56) References Cited

U.S. PATENT DOCUMENTS

| | | | | |
|---|---|---|---|---|
| 2007/0277985 A1* | 12/2007 | Hager | ..................... | A01G 20/12 |
| | | | | 172/19 |
| 2012/0000428 A1* | 1/2012 | Keating | ............... | A01K 1/0107 |
| | | | | 119/28.5 |
| 2013/0298840 A1* | 11/2013 | Mishan | ................ | A01K 1/0107 |
| | | | | 119/165 |
| 2014/0090605 A1* | 4/2014 | Feld | ........................ | A01G 9/033 |
| | | | | 119/169 |
| 2015/0196004 A1* | 7/2015 | Norman | ................ | A01K 1/0125 |
| | | | | 119/165 |
| 2019/0090450 A1* | 3/2019 | Moore | .................... | A01G 31/00 |
| 2020/0178490 A1* | 6/2020 | Taylor | .................. | A01K 1/0107 |

FOREIGN PATENT DOCUMENTS

| | | | | | |
|---|---|---|---|---|---|
| CA | | 2704535 A1 | * | 1/2011 | ........... A01K 1/0107 |
| CA | | 2843086 A1 | * | 8/2014 | ............ A01G 1/005 |
| DE | 102016001750 A1 | * | 8/2017 | |
| KR | 20180116087 A | * | 10/2018 | |
| WO | WO-0019809 A1 | * | 4/2000 | ........... A01K 1/0107 |
| WO | WO-2018182561 A1 | * | 10/2018 | ............... A01K 1/01 |

OTHER PUBLICATIONS

Evergreen Turf, How Long Does It Take for Sod to Take Root, May 2015, (Year: 2015).*
Fresh Patch, Frequently Asked Questions, Jun. 2015, https://www.freshpatch.com/pages/faq (Year: 2015).*

* cited by examiner

*Primary Examiner* — Joshua D Huson
*Assistant Examiner* — Alanna K Peterson
(74) *Attorney, Agent, or Firm* — Adrienne Love (57) ABSTRACT

The present pet waste station system is made up of a plurality of units having a sod section which fits into a tray. The method of preparing the system includes growing the sod section apart from the tray for a period. The sod section has live grass, a root system and a soil medium. Once the root system is established in the soil medium, the sod section is placed into the tray, which has a bottom, a series of walls and a ledge with a plurality of interlocking nodes. Two units can connect by engaging interlocking nodes from one unit to interlocking nodes of another unit. Once connected, the overlapping ledges form a seal that prevents liquid from escaping between two units when the pet waste station system is in use.

5 Claims, 10 Drawing Sheets

LIVING-GRASS PET WASTE STATION SYSTEM

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

1. Field of the Invention

This invention relates to living-grass pet waste station system that is specifically useful for absorbing pet waste and associated odors.

2. Description of the Related Art

Pet owners typically must take a pet outside to deal with a pet's bodily waste. The pet may have to relieve itself multiple times a day. This can be impractical and burdensome for many pet owners. For example, owners who live in apartments must take their pet not only out of the building but often to a park or grassy area. The owner may find this particularly difficult if it is late at night or in inclement weather. In another example, an owner may need to potty train a pet, requiring extremely frequent trips outside during the day and night, especially for a young pet such as a young dog. These owners need another, more convenient option that does not require a trip outside. This option can also assist owners who are required to leave their pets at home unattended.

Figure 1:
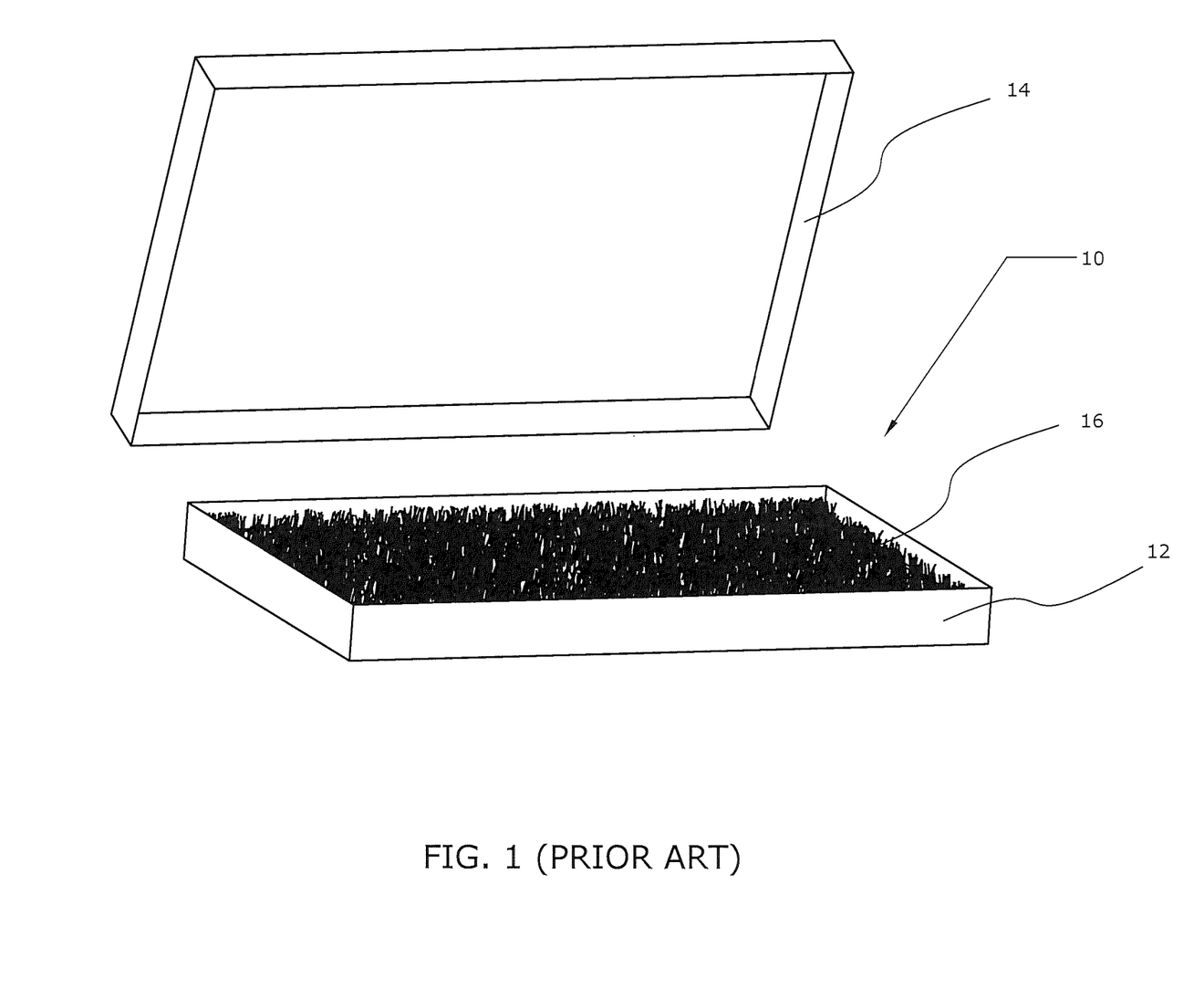
FIG. 1 is a perspective view, showing a prior art portable pet toilet.
Figure 2:
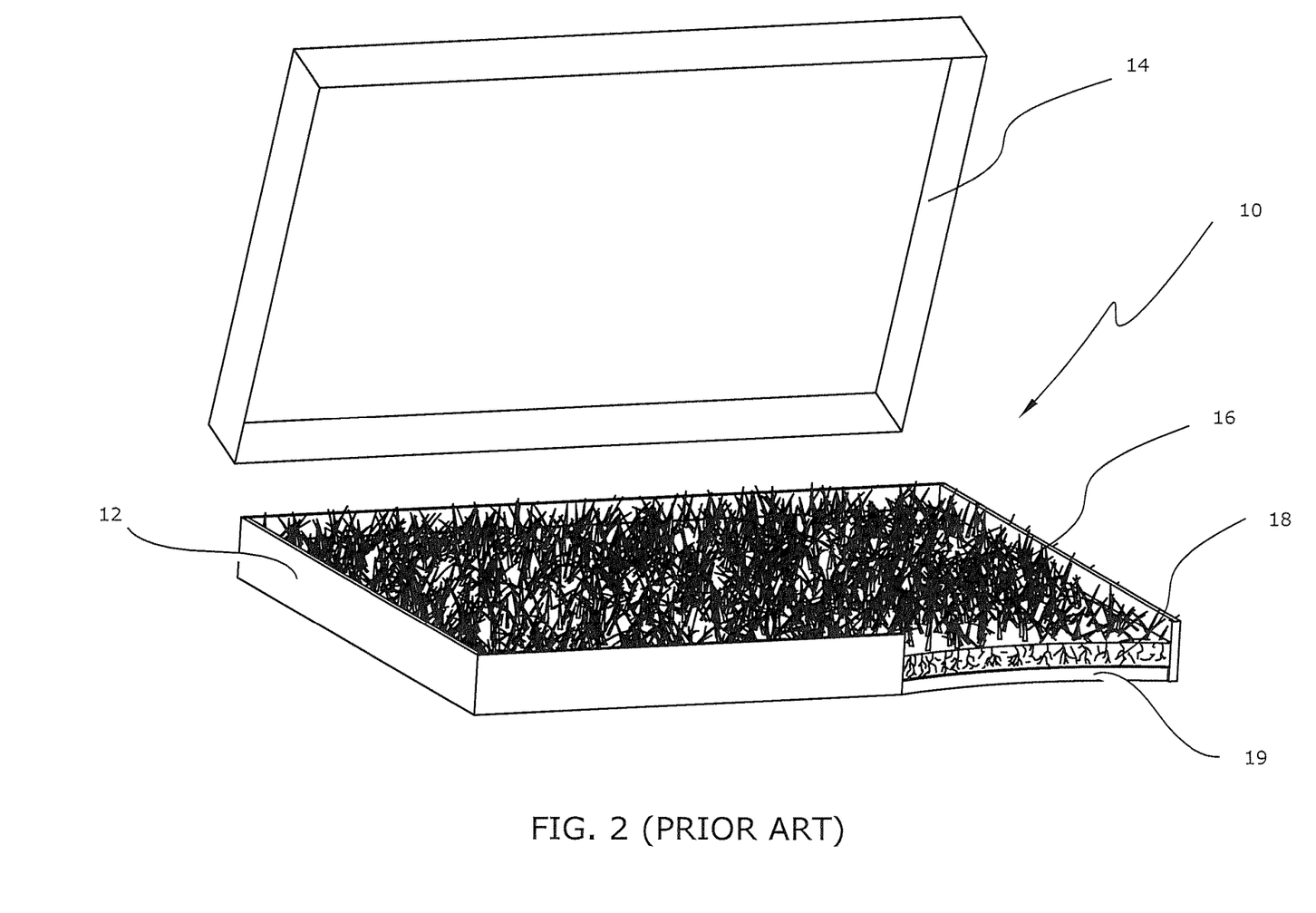
FIG. 2 is a cut-away perspective view, showing a prior art portable pet toilet.

This problem has been addressed in the past with pads or trays that allow a pet to relieve themselves indoors or on a porch, rather than taking a trip outside of the apartment or house where the owner resides. An example of a prior art portable pet toilet 10 is shown in FIGS. 1 and 2. Prior art portable pet toilet is generally made up of a prior art box 12, prior art synthetic grass 16 (or live soil-less grass, grown hydroponically with roots 18) and prior art tray 19. The prior art lid 14 can be removed to provide a pet access to a grass 16 surface in order to relieve themselves. The prior art portable pet toilet 10 must be changed or cleaned frequently to avoid odor and moisture build up. Additionally, the prior art portable pet toilet 10 is not capable of expansion in area. Therefore, a pet is forced to use a small area to repeatedly eliminate waste.

Therefore, what is needed is a pet waste station system that provides a natural surface with odor and moisture absorbing ability, along with the ability to expand to a desired area. The present system achieves these objectives, as well as others that are explained in the following description.

BRIEF SUMMARY OF THE INVENTION

The present pet waste station system generally comprises a unit or units having a sod section and a tray. Sod section has live grass, root system, soil medium and soil additive, such as calcined clay. Each sod section is developed (grown) prior to installation in the system, such that the root system and live grass is sustainable for a longer period of time during usage. Tray has a bottom, a series of walls and a ledge extending around the perimeter of walls. Ledge of tray includes a plurality of nodes that are capable of interlocking with nodes on a second tray. Units connect to one another by fitting and pressing nodes together along the ledge of each tray on each unit. It is in this manner that the pet waste station system can expand easily to cover large or oddly shaped areas.

In use, liquid enters the pet waste station system on the grassy surface. Interlocking nodes and overlapping ledges prevent liquid from leaking between two units. As liquid enters sod section, roots of live grass, soil medium and soil additives act to absorb moisture and odors. If additional liquid remains, that liquid travels downward to bottom of tray. Moisture can accumulate in tray. However, any liquid that reaches tray would be diluted and therefore primarily odorless. Water can be used to water grass and dilute and disperse liquid pet urine through system. Additionally, tray can be emptied and cleaned if necessary. The waste station system eliminates unwanted odors from the pet's liquid waste. Solid waste can be picked up off the live grass, in the same manner as an owner would remove the solid waste outside. Clean up of solid waste is much easier than a typical waste removal because of the use of a low profile, high density proprietary turf (live grass).

The present expandable pet waste station system can be used indoors or outdoors for pet waste products. This can be particularly helpful for potty training a pet or when it is inconvenient for a pet owner to take a pet outside.

REFERENCE NUMERALS IN THE DRAWINGS 10 prior art portable toilet
12 prior art box
14 prior art lid
16 prior art synthetic grass
18 prior art roots
19 prior art tray
20 waste station system
21 unit
22 base 24 lid
26 latch
28 live grass
30 tray
31 walls
32 sod section
33 bottom
34 raised member
36 ledge
38 interlocking node
40 opening
42 root system
44 calcined clay
46 soil medium
48 interlocking node
50 detent

DETAILED DESCRIPTION OF INVENTION

Figure 3:
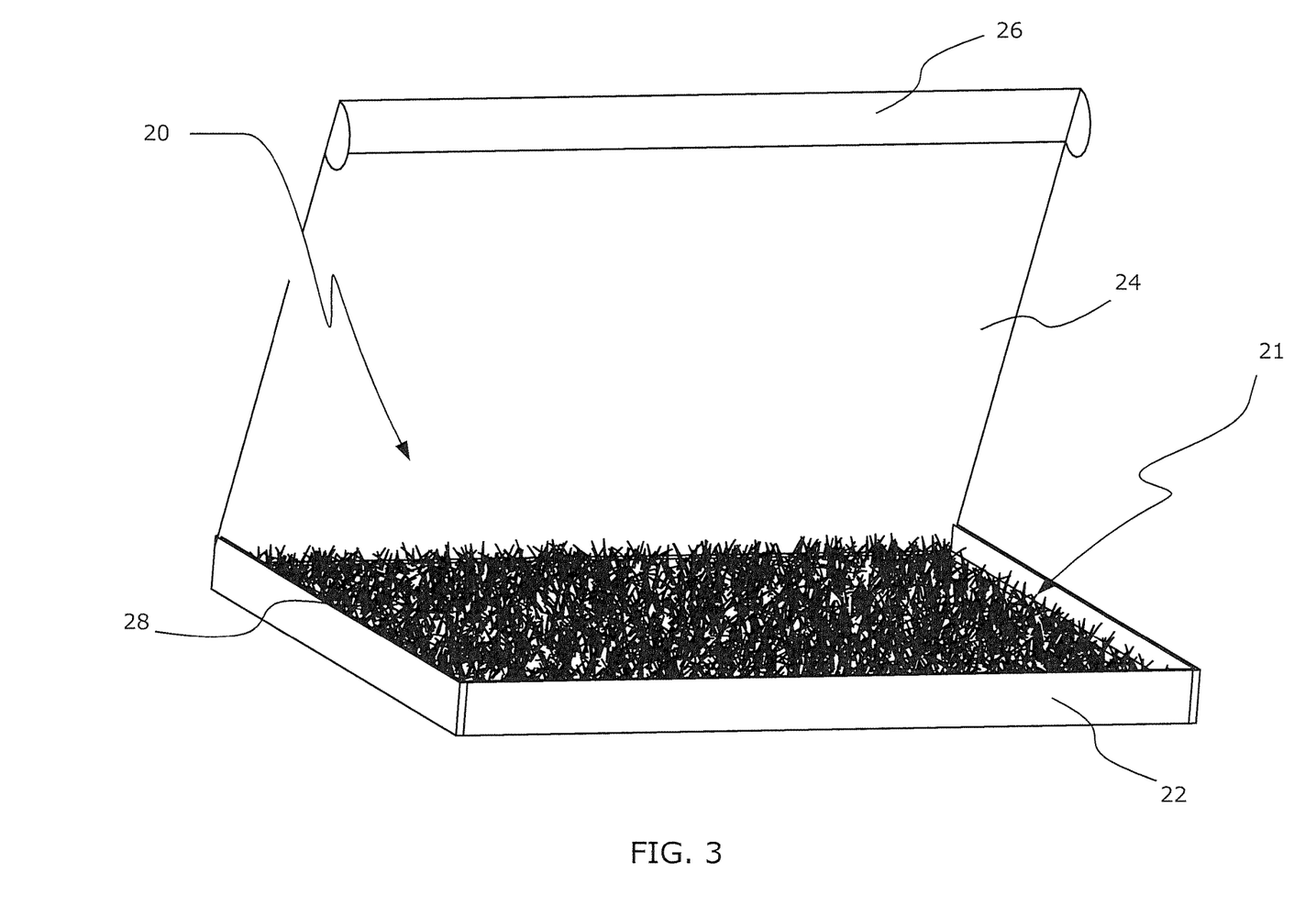
FIG. 3 is a perspective view, showing the present invention.
Figure 9:
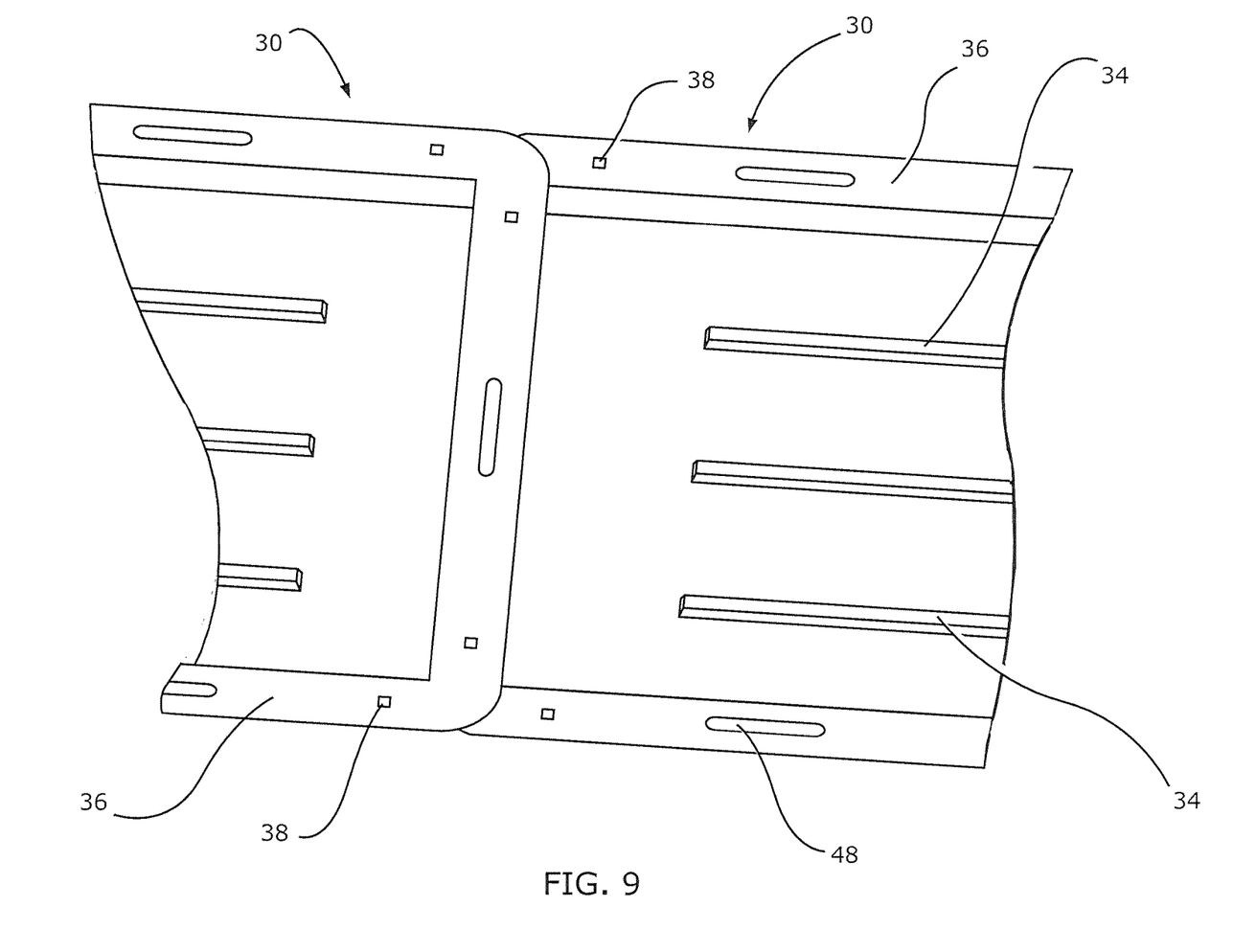
FIG. 9 is a perspective view, showing two interlocking trays locked together.
Figure 10:
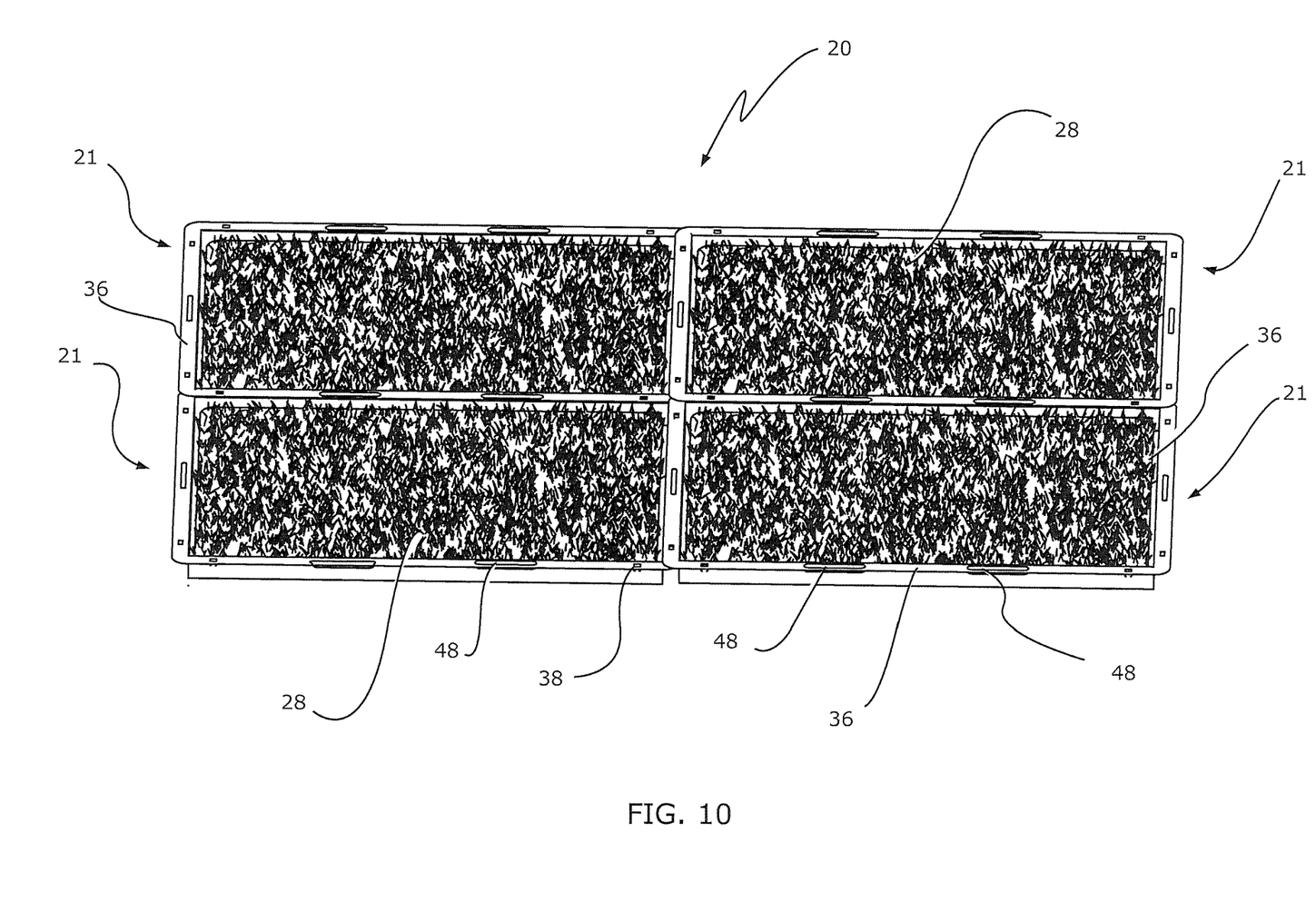
FIG. 10 is a perspective view, showing several interlocking units of the present invention.

The present invention is an interlocking living grass pet waste station and method of using the same. FIG. 3 illustrates the present pet waste station system 20 with one unit 21 in its packaging, which generally is made up of a cardboard box having a base 22, lid 24 and latch 26. However, the reader will appreciate that the packaging can be any type of wrapping, covering or vessel, such that the packaging surrounds and encloses a unit 21 of pet waste station system 20 for sale. Additionally, packaging is not needed at all, as shown and described in FIGS. 4-10. One unit 21 or many units connected can comprise the present pet waste station system 20. FIG. 10 illustrates a series of connected units 21 which form pet waste station system 20. An advantage of the waste station system 20 is its unlimited expandability.

Figure 4:
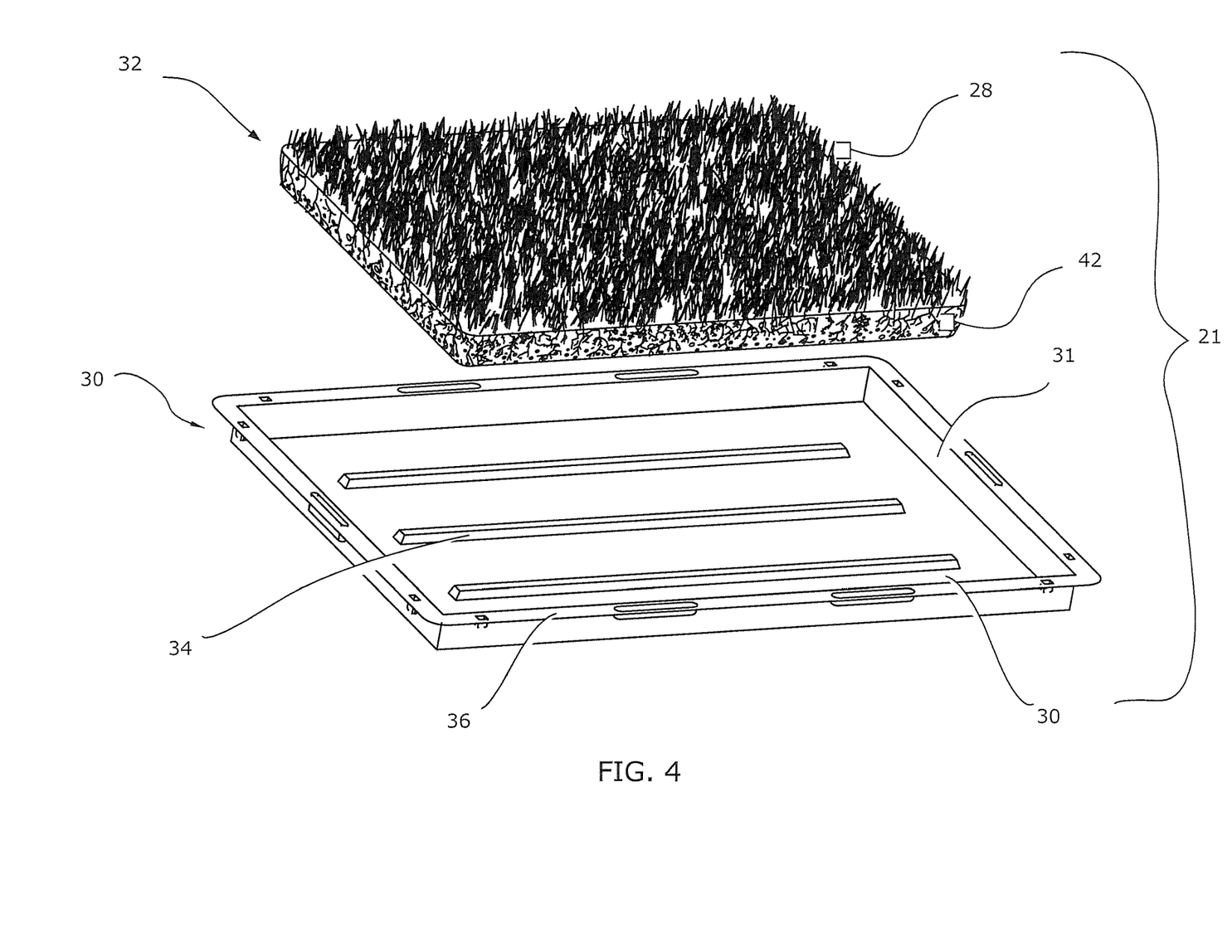
FIG. 4 is an exploded view, showing the present invention.

FIG. 4 shows an exploded view of one unit 21 of the present living grass pet waste station system 20. A unit 21 is generally comprised of tray 30 and sod 32 which fits into tray 30. Tray 30 has a bottom 33, with several raised members 34, and a plurality of walls 31 extending upward from perimeter of bottom 33. Ledge 36 is located around the top of walls 31, extending outward approximately perpendicular to walls 31. Sod section 32 is shaped to fit into tray 30 such that live grass 28 extends above the level of ledge 36 (shown in FIG. 10). The present system is designed such that all or nearly all moisture from pet waste or otherwise is absorbed by sod section 32 prior to reaching bottom 33 of tray 30.

Figure 5:
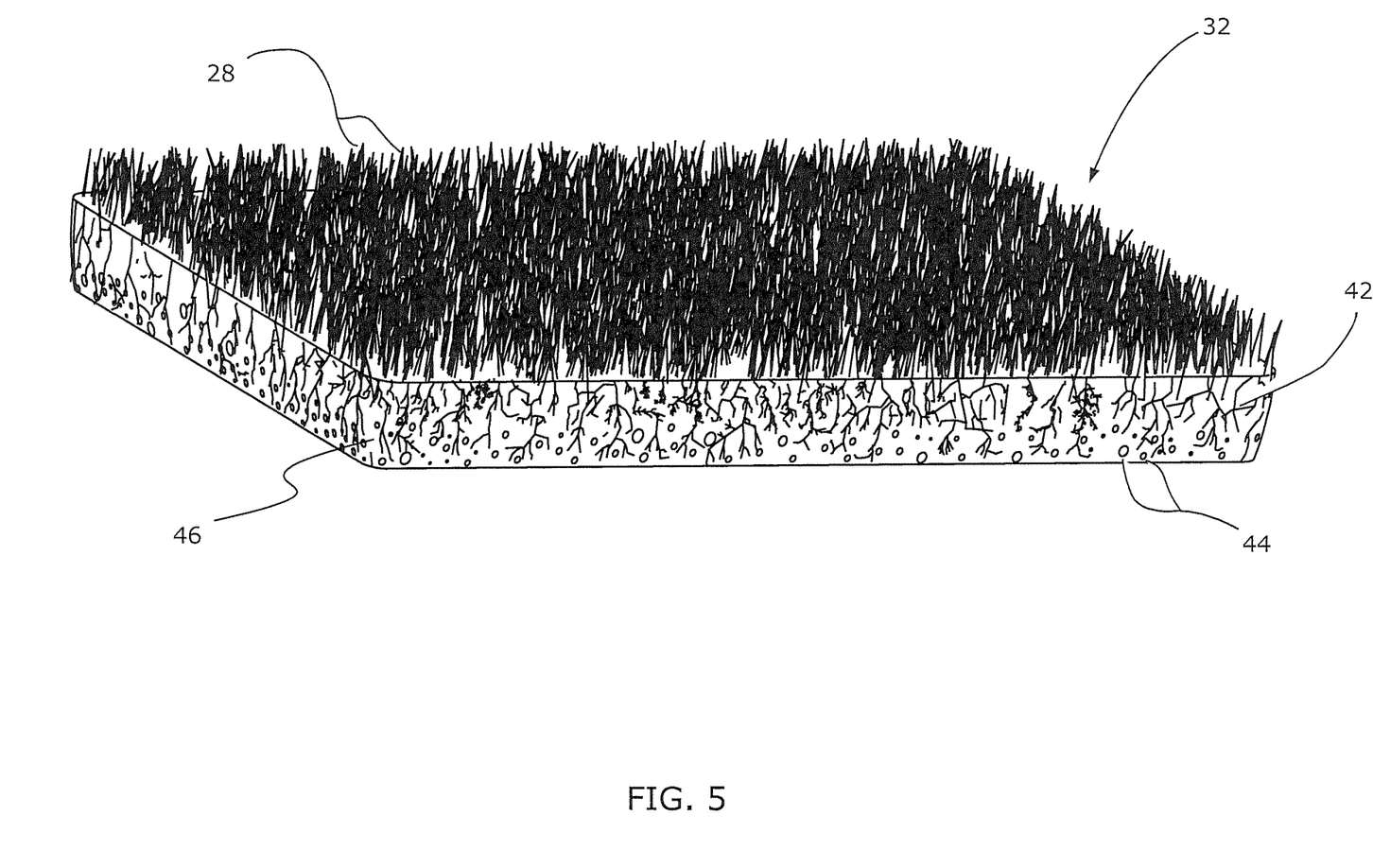
FIG. 5 is a perspective view, showing the sod section of the present invention.

Sod section 32 is shown in FIG. 5. Sod section 32 generally has soil medium 46, root system 42 and live grass 28, but also can include a soil modifier, such as calcined clay 44 (described herein). Sod section 32 is not simply a section of prior art sod. Instead sod section 32 is pre-grown such that root system 42 of live grass 28 and calcined clay 44 are established within soil medium 46 prior to shipment to an end user. Each sod section 34 has an amount of calcined clay added to it. Further, the optimum growth period for Fall, Winter and Spring is 4 weeks (optimal range from 25-35 days). In Summer months, because sun exposure is at its maximum, this period may decrease to 14-30 days. The optimum period allows root system 42 to establish itself for the most stability and longevity. In other words, if the live grass 28 has too little time to take root, the grass may brown and die quickly (potentially in transit to end user.) Once established the sod section 32 is harvested and shipped the same day to an end user such that the live grass can continue to grow during use.

In manufacture, sod section 32 is placed on a finishing tray (not shown) which has a series of holes for drainage and maturation of root system during growing process. Soil medium 46 can be any mixture of known ingredients. A field grown warm season turf such as Bimini® Bermuda Turfgrass provides an ideal platform for live grass 28. Ideal features for the turfgrass are proven drought tolerance, dark green color, high salt tolerance (preferably over 2,500 PPM TDS), shear and wear tolerance and dense populace of rhizomes compared to common Bermudagrass Cultivars. A turf colorant with a proprietary binder can be used to minimize the appearance of chlorosis and to prevent color transfer of colorant in undesirable areas. A growth regulator can be included in soil medium to increase the density of the grass and prolong the life and quality of the overall product. A soil modifier 44, such as calcined clay, is added to soil medium to assist in absorption of pet odor and moisture from pet urine, essentially removing the pet urine from the surrounding soil medium. Therefore, the root system 42 of the live grass 28 can continue to thrive and grow, rather than dying from exposure to the pet's urine, while the urine is absorbed to create a clean, fresh smelling environment.

Live grass 28 can also be watered to assist with continued growth during use. Liquids can be absorbed at many points through the waste station system. Liquids enter the waste station system at or proximate live grass 28, grass 28 breaks apart liquid into smaller droplets as it enters system. Liquids enter soil medium 46 and the area of root system 42 next. Root system 42 and soil medium 46 both can absorb some amount of liquid, reducing the total volume of liquid, but also further distributing liquid within root system 42. As liquid is distributed calcined clay 44 absorbs excess liquid and odors, keeping the soil medium 46 fresh and the system odor free. Excess liquid can be trapped by tray 30. A user can empty and clean tray 30 if necessary. However, the present system is designed to eliminate the need for cleaning and can be used for several weeks prior to replacement. Upon replacement the sod section 32 can be planted or composted and the tray 30 can be recycled or reused for the next order.

Figure 6:
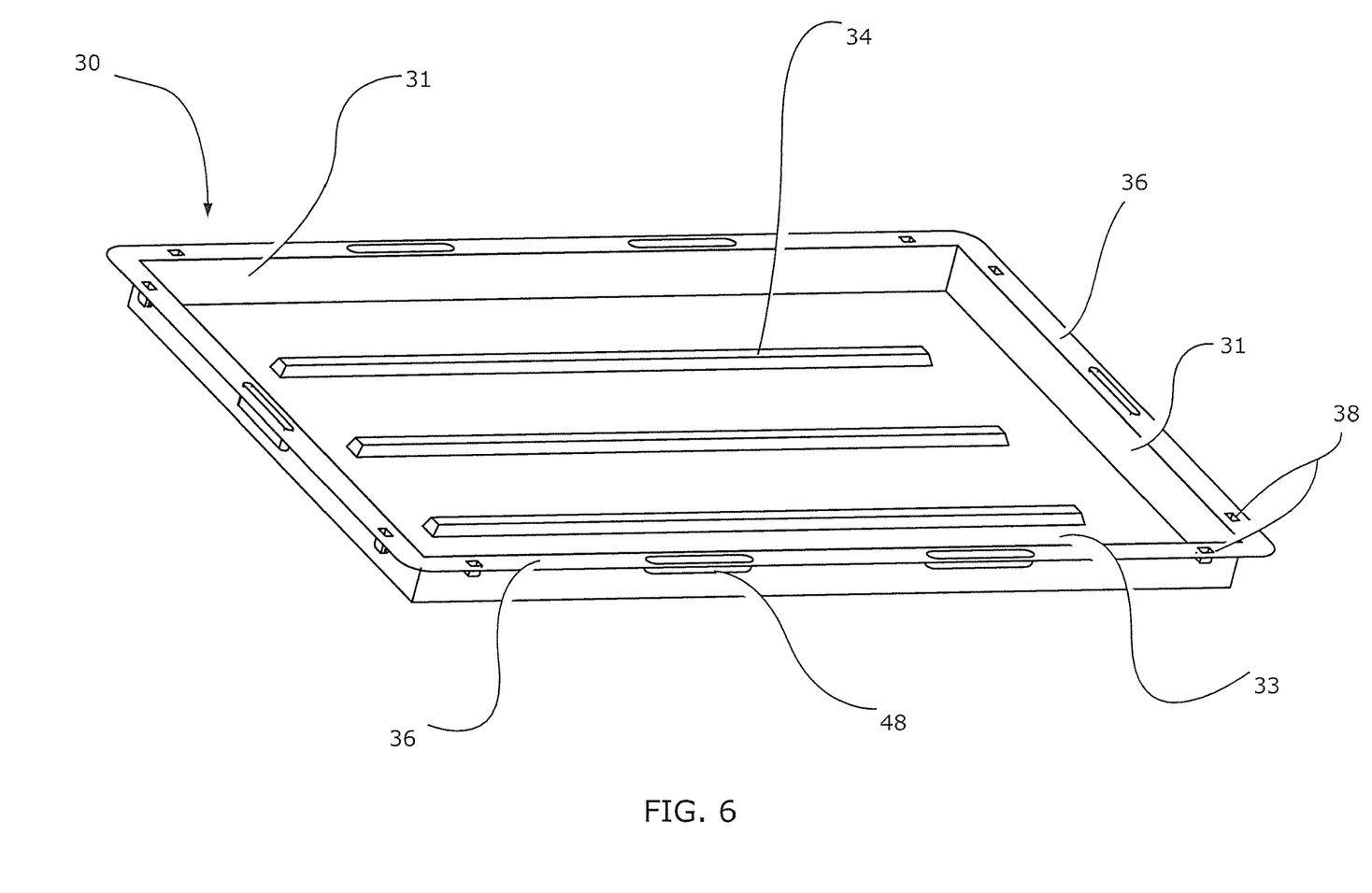
FIG. 6 is a perspective view, showing the tray of the present invention.

An exploded view of tray 30 is shown in FIG. 6. Tray 30 can be made of any suitable material. In one example, tray 30 is made of a reusable and recyclable plastic. Tray 30 has bottom 33, a series of walls 31, ledge 36, raised members 34 and small and large interlocking nodes 38, 48. Tray 30 is of a sufficient depth to accept sod section 32 (not shown) and optionally include a series of raised members 34. Ledge 36 includes a plurality of interlocking nodes 38, 48. Tray 30 can be variable in size and shape, so long as nodes 38, 48 and ledge 36 can still align and overlap to form a leakage proof seal between units.

Figure 7:
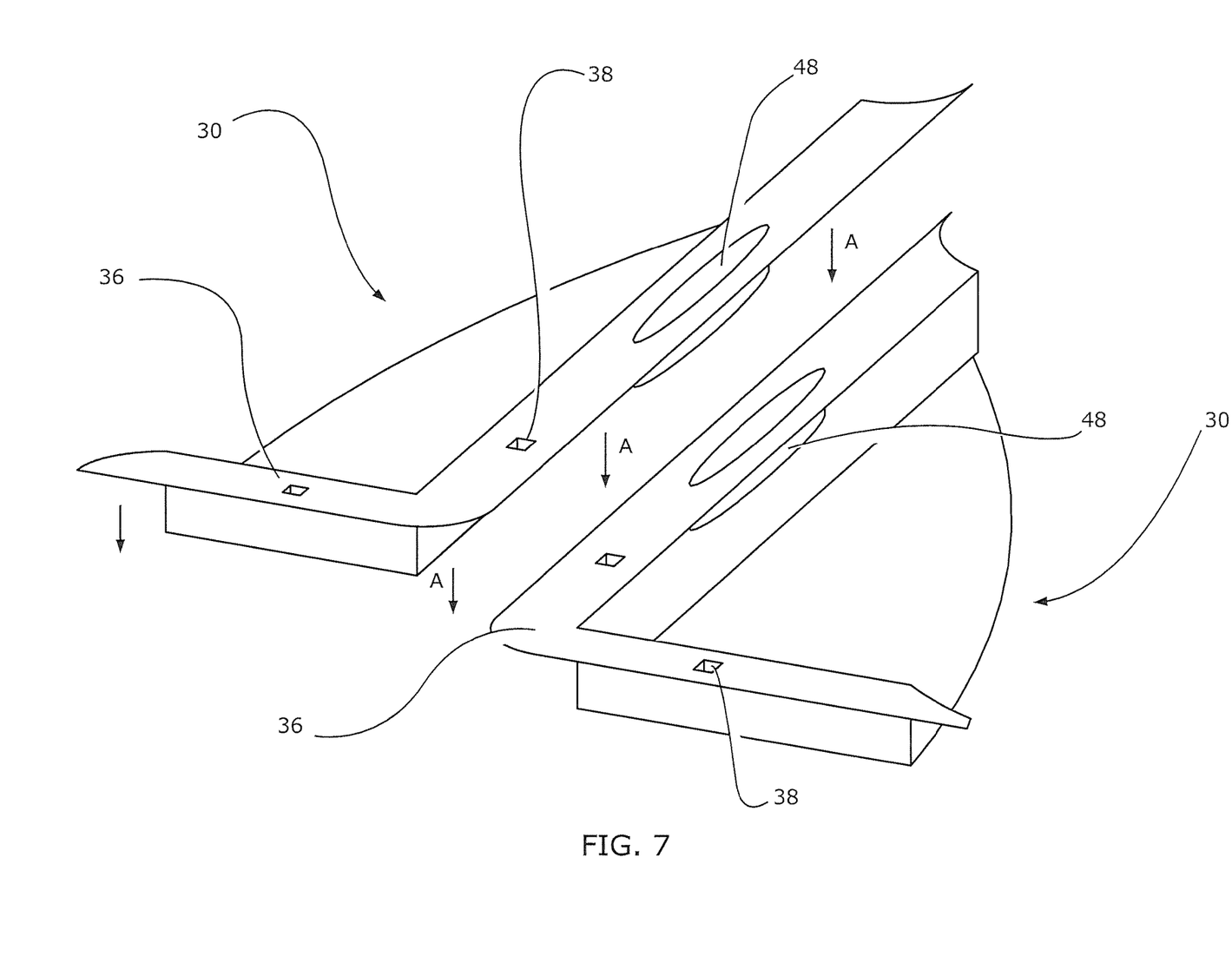
FIG. 7 is an exploded view, showing the interlocking functionality of the present invention.
Figure 8:
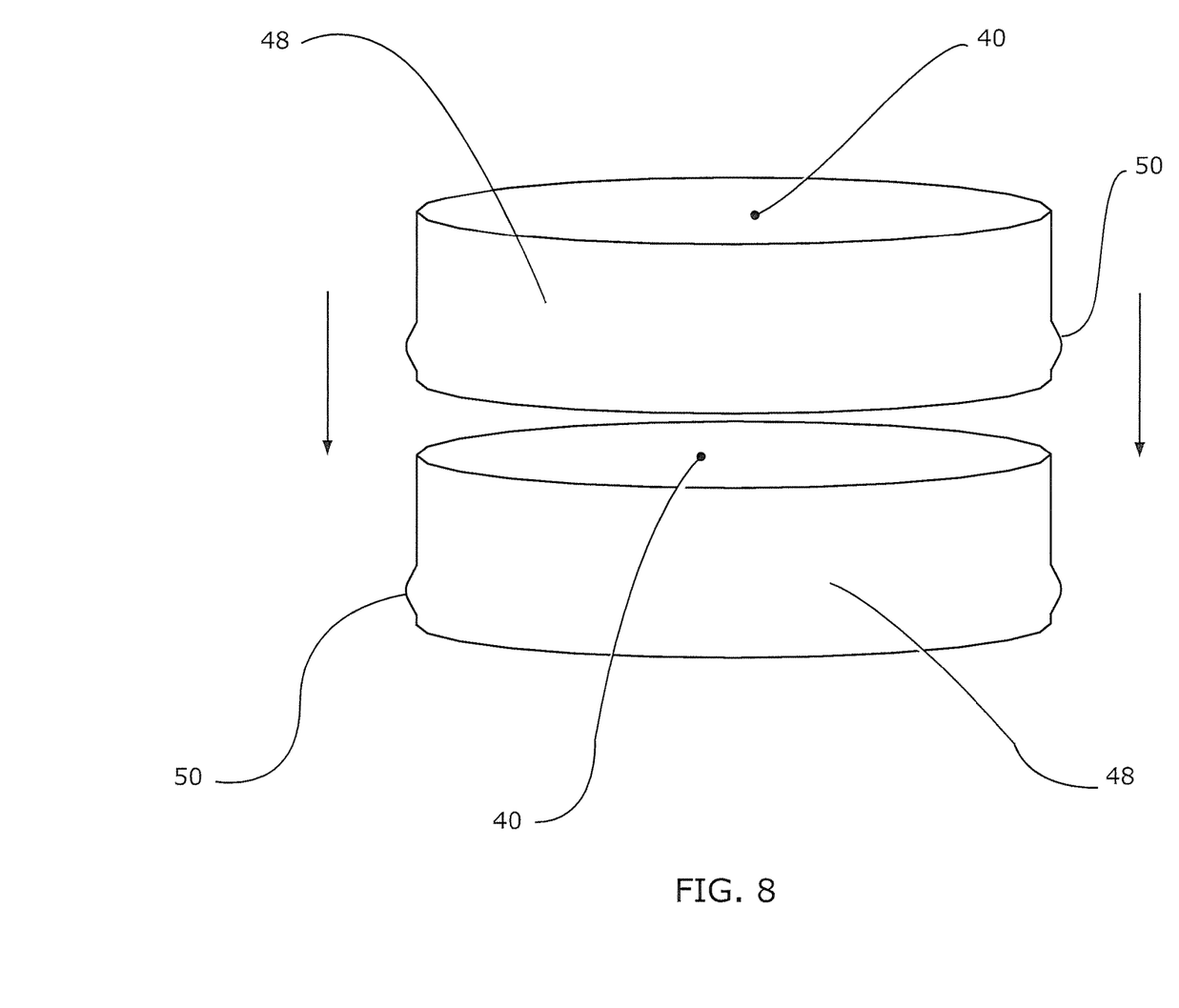
FIG. 8 is an exploded close-up view, showing two interlocking nodes on two trays.

Interlocking nodes 38, 48 on two trays 30 of two units are shown in FIGS. 7 and 8. For clarity, nodes 38, 48 are along the edge of ledge 36, as shown in FIG. 7. In order to connect two units, ledge 36 and node 38, 48 of one tray 30 is raised above ledge 36 of another tray 30. Nodes 38, 48 are shaped to fit into one another. An optional detent 50 can be included in large interlocking node 48 to assist in locking the two nodes 48 together, as shown in FIG. 8. The top node 48 is pushed firmly into the opening 40 on bottom node 48 as shown by the arrows in both FIGS. 7 and 8. After each node 38, 48 along one side of tray 30 is pushed into each node 38, 48 on a second tray 30 (adjacent insert), the two trays 30 are engaged with one another, such that liquid cannot escape between the two trays 30 (and therefore two units 21)—this is best illustrated in FIGS. 9 and 10. FIG. 10 illustrates two trays 30 engaged with one another end to end. Each small interlocking node 38 rests in a respective small interlocking node 38 on the lower tray 30. The large interlocking nodes 48 on each tray 30 secures the two trays 30 in place with one another. A leakproof seal is formed along the overlapping ledges 36 of each tray 30. The reader will appreciate that the trays 30 can also be engaged side to side—it is in this manner that a multitude of trays 30 can be connected to form a larger system of units 21.

FIG. 10 shows pet waste station system 20 with four units 21 connected to one another. Each unit 21 has live grass 28 growth uniformly across the top of unit 21. Pets are drawn to the natural surface of the present system 20. The reader will appreciate that the pet waste station system 20 can be one unit 21 or a plurality of units 21. A user can expand the system 20 as large as desired. This can be particularly useful on a porch or balcony, where one area of the porch or balcony is devoted to the pet waste station system 20. A larger system 20 may also be desirable when a user has a larger pet or multiple pets. Additionally, a larger pet waste station system 20 allows for the absorption of more waste thereby extending the life of the system 20. The secure connection of the system through interlocking nodes 38, 48 prevents waste from seeping between units 21. Ledge 36 from each unit 21 overlaps with the neighboring unit 21 when connected, therefore liquid waste naturally travels to grassy area of units 21. A user can also water the grass 28 to dilute the liquid waste and disperse the liquid waste through the system 20 such that it can be absorbed naturally. After use, the present system 20 can be composted, replanted, recycled or reused.

The preceding description contains significant detail regarding the novel aspects of the present invention. It should not be construed, however, as limiting the scope of the invention but rather as providing illustrations of the preferred embodiments of the invention. For example, the odor absorbing material can be silicate clay rather than calcined clay. Thus, the scope of the invention should be fixed by the following claims, rather than by the examples given.

Having described my invention, I claim:

1. A method of preparing a pet waste station for use by an end user for a domestic animal, comprising the steps of:
   growing a portion of live grass in a volume of soil medium having an amount of calcined clay for a period of time in the range of 14-35 days, wherein said section of live grass develops a root system extending throughout said portion of soil medium, such that said section of live grass, said volume of soil medium, said amount of calcined clay and said root system forming a sod section,
   cutting a plurality of sod sections into a plurality of desired shapes,
   providing a plurality of trays, each of said trays having a bottom, a series of walls having a perimeter, and a ledge around said perimeter of said series of walls, wherein said ledge has a plurality of interlocking nodes,
   forming a plurality of units by fitting said plurality of said sod sections into said plurality of trays,
   providing said plurality of units to said end user to use for said domestic animal, wherein said end user can water said portion of live grass to assist continued growth during use; and
   disposing of said plurality of units by recycling said plurality of trays and planting said plurality of sod sections, wherein said plurality of sod sections are still alive such that said end user can plant said sod section after a period of use by said domestic animal of up to 14 days.

2. The method of preparing a pet waste station for use by a domestic animal of claim 1, further comprising the step of:
   connecting said at least two of said plurality of units by engaging said plurality of interlocking nodes on at least two ledges of at least two trays together.

3. The method of preparing a pet waste station for use by a domestic animal of claim 1, wherein said step of growing a portion of live grass in a volume of soil medium further comprises, using a turfgrass with a high salt tolerance over 2,500 PPM TDS.

4. The method of preparing a pet waste station for use by a domestic animal of claim 1, wherein said period of use by said domestic animal is two to four weeks.

5. A method of preparing a pet waste station for use by an end user for a domestic animal, comprising the steps of:
   growing a portion of live grass in a volume of soil medium having an amount of calcined clay for a period of time in the range of 14-35 days, wherein said section of live grass develops a root system extending throughout said portion of soil medium, such that said section of live grass, said volume of soil medium, said amount of calcined clay and said root system forming a sod section,
   applying a turf colorant with a binder to said portion of live grass, wherein said binder prevents color transfer from said live grass to said domestic animal,
   cutting a plurality of sod sections into a plurality of desired shapes,
   providing a plurality of trays, each of said trays having a bottom, a series of walls having a perimeter, and a ledge around said perimeter of said series of walls, wherein said ledge has a plurality of interlocking nodes,
   forming a plurality of units by fitting said plurality of said sod sections into said plurality of trays,
   packaging said plurality of units, each in a cardboard box having a base, a lid and a latch,
   shipping said plurality of units to an end user, wherein said end user can enhance growth of said portion of said live grass throughout a period of use by said domestic animal by watering said portion of said live grass, and
   planting said portion of said live grass which is still alive to plant after said period of use, wherein said period of use is two to four weeks.

* * * * *